W. H. FULLERTON.
Hackling Machine.
No. 11,277. Patented July 11, 1854.
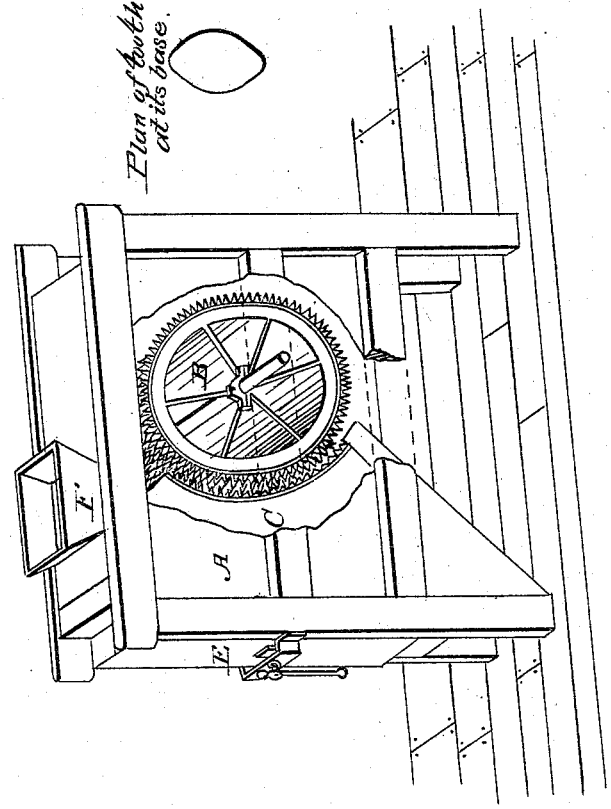

UNITED STATES PATENT OFFICE.

WM. H. FULLERTON, OF LOUISVILLE, KENTUCKY.

IMPROVEMENT IN MACHINES FOR HACKLING CORN-HUSKS.

Specification forming part of Letters Patent No. 11,277, dated July 11, 1854.

*To all whom it may concern:*

Be it known that I, WILLIAM HENRY FULLERTON, of Louisville, in the county of Jefferson and State of Kentucky, have invented a new and Improved Machine for the Purpose of Hackling Corn-Husks; and I do hereby declare that the following is a full and exact description.

The nature of my invention consists in disposing cast-iron or other metallic teeth of the form shown in the drawings on the outer circumference of a cylindrical drum in lines parallel to each other in the direction of the axis of the cylinder, each row of teeth being set opposite the center of the interval between each tooth of the row preceding and succeeding it, always preserving the longer axis of the oval-shaped tooth in the line of the greatest strain upon it, and the said drum being moved by hand, horse, or other power mounted upon suitable shafts, bearings, &c., within a framed wooden or other case, and acting in connection with similar teeth arranged in the same manner upon a stationary concave surface, as represented in the drawings annexed, where A represents the case or wooden framework, B the cylindrical drum, C the concave surface, extending the whole length of the drum, and in depth about one-third the circumference of it, the said concave surface being affixed to a slide, E, so as to bring the teeth of it nearer or place them farther from the drum, as occasion may require. The slide is operated upon by a lever and screw, as represented in the perspective drawings. The corn-husks being fed into the hopper F are, by the combined action of the teeth on the drum and concave surface, split into ribbons for stuffing mattresses and other useful purposes.

To enable others skilled in the art to make and use my invention, I will proceed to describe its construction and operation.

I construct the drum in the following manner: Having decided upon its diameter and length, (which may vary at the pleasure of the maker,) I mount upon a shaft of proper dimensions for working, either by hand, horse, or other power, two cast-iron wheels—one for each end of the drum—and having divided the circumference of them into any number of equal parts for the width of plates to form the drum which will be most convenient for casting, I make the pattern of wood, and affix the teeth on the plate either by casting them with it or by casting or forming them separately and riveting, the teeth being of the form shown in the drawings, where—

Figure 1 represents the plan of the tooth at its base, and Fig. 2 represents the arrangement on a line parallel to the axis of the drum, every other row being an odd number and set opposite the space left between the teeth of the preceding one, and the distance from the center of the teeth of one row to the center of the teeth on the next being one inch, and from the center of one tooth to another on the same row being two inches. The plates, being then cast in iron or other metal, are bolted onto the two cast-iron wheels, and the shaft mounted on bearings or pillow-blocks affixed to the frame of the wooden case, and provided with such gearing as may be determined on for giving a rotary motion to it, suitable for the description of power to be employed.

The plates, with the teeth arranged in the same manner as above described, I make for the concave surface by dividing it into any number of equal parts, making a pattern with the teeth affixed, and the plates, being cast in iron or other metal, are bolted onto a wooden or other frame for the purpose of constituting a slide. The length of the concave surface is the same as the length of the drum, and the depth of its curve about one-third of the circumference of the drum. It rests on the bottom of the case, and is moved either nearer to or farther from the drum by a screw and lever affixed to the outside of the frame-work of the case. The plates on the concave surface are bolted onto its frame in such a manner with reference to those on the drum that they may not touch each other when the points pass each other one-quarter of an inch by the slide being screwed up. The corn-husks, being fed into a hopper placed on the frame or case, are, by the revolution of the cylindrical drum, drawn between the teeth of it and those of the concave surface, and are split into ribbons for stuffing mattresses and other useful purposes.

I do not claim as my invention the plan of forming the drum or the adjusting concave surface, nor the manner of forming the wooden or other case, nor the kind of gearing to be used to suit the purpose of working the machine by either hand or other power.

What I claim as my invention, and desire to secure by Letters Patent, is—

The particular form of the teeth employed, of whatever material they are made, for the purpose of being arranged in any way on drums or otherwise, and the particular application of them, for the purpose of hackling corn-husks, as is hereinbefore set forth.

WILLIAM H. FULLERTON.

In presence of—
D. BETHUNE DUFFIELD,
J. KNOX GAVIN.